(12) United States Patent  
Tojo

(10) Patent No.: US 8,881,861 B2  
(45) Date of Patent: Nov. 11, 2014

(54) STEERING SYSTEM

(71) Applicant: JTEKT Corporation, Osaka (JP)

(72) Inventor: Hirokazu Tojo, Kashiba (JP)

(73) Assignee: JTEKT Corporation, Osaka (JP)

(*) Notice: Subject to any disclaimer, the term of this patent is extended or adjusted under 35 U.S.C. 154(b) by 0 days.

(21) Appl. No.: 13/891,898

(22) Filed: May 10, 2013

(65) Prior Publication Data

US 2013/0306396 A1    Nov. 21, 2013

(30) Foreign Application Priority Data

May 16, 2012    (JP) ................................ 2012-112705

(51) Int. Cl.
*B62D 5/04* (2006.01)
*F16K 27/00* (2006.01)

(52) U.S. Cl.
CPC .............. *F16K 27/00* (2013.01); *B62D 5/0424* (2013.01); *B62D 5/0448* (2013.01)
USPC .......................................... 180/444; 180/446

(58) Field of Classification Search
CPC ............ B62D 5/07; B62D 5/065; B62D 5/22; B62D 5/04; F16H 55/283
See application file for complete search history.

(56) References Cited

U.S. PATENT DOCUMENTS

| | | | | |
|---|---|---|---|---|
| 6,065,561 A * | 5/2000 | Howard | ........................ | 180/441 |
| 6,272,947 B1 * | 8/2001 | Howard | .......................... | 74/499 |
| 6,439,939 B1 * | 8/2002 | Jaeger | ......................... | 440/88 R |
| 6,817,437 B2 * | 11/2004 | Magnus et al. | ............... | 180/403 |
| 2012/0152645 A1 | 6/2012 | Matthias | | |

FOREIGN PATENT DOCUMENTS

| | | |
|---|---|---|
| DE | 44 20 586 C1 | 11/1995 |
| DE | 10 2007 015 327 A1 | 10/2008 |
| DE | 10 2007 015 329 A1 | 10/2008 |
| DE | 10 2009 039 832 B3 | 1/2011 |
| EP | 2 664 518 A2 | 11/2013 |
| WO | WO 2008/089910 A1 | 7/2008 |
| WO | WO 2011026583 A2 * | 3/2011 |

OTHER PUBLICATIONS

Jun. 25, 2014 Extended European Search Report issued in European Patent Application No. 13167590.2.
Jul. 17, 2014 Extended Search Report issued in European Patent Application No. 14160844.8.

* cited by examiner

*Primary Examiner* — Joseph M Rocca
*Assistant Examiner* — Marlon Arce
(74) *Attorney, Agent, or Firm* — Oliff PLC

(57) ABSTRACT

A steering system includes a rack housing and a drainage device. The drainage device has a drainage case, and a drainage valve made of a resin. The drainage case has a case inlet port communicated with a housing space of the rack housing, case outlet ports communicated with the outside of the rack housing, a drainage space communicated with the case inlet port and the ease outlet ports, and a convex portion. The drainage valve has a valve body inlet port portion, and a valve body outlet port portion that interrupts communication between the case inlet port and the case outlet ports when the valve body outlet port portion comes into contact with the convex portion.

12 Claims, 5 Drawing Sheets

STEERING SYSTEM

INCORPORATION BY REFERENCE/RELATED APPLICATION

This application claims priority to Japanese Patent Application No. 2012-112705 filed on May 16, 2012 the disclosure of which, including the specification, drawings and abstract, is incorporated herein by reference in its entirety.

BACKGROUND OF THE INVENTION

1. Field of the Invention

The invention relates o a steering system that includes a rack housing and a drainage device.

2. Discussion of Background

The configuration of a drainage device in US 2012/0152645 A1 will be described with reference to FIG. 5 and FIG. 6. A drainage device 200 includes a drainage case 210, a drainage valve 240, and a seal ring 250. The drainage case 210 has a first drainage case 220 and a second drainage case 230. The drainage case 210 is formed by connecting the first drainage case 220 and the second drainage case 230, which are formed as separate parts, to each other.

The first drainage case 220 has a case inlet port 221. The case inlet port 221 is communicated with a housing space of a rack housing (not shown). The second drainage case 230 has case outlet ports 231. The case outlet ports 231 are communicated with the outside of the rack housing. The drainage valve 240 has a body portion 241 and a flange portion 242. As the flange portion 242 comes into contact with the inner face of the first drainage case 220, the flange portion 242 interrupts communication between the case inlet port 221 and the case outlet ports 231.

In a steering system (not shown) described in US 2012/0152645 A1, water may enter the housing space from the outside of the rack housing. The water that has entered the housing space flows into the first drainage case 220 through the case inlet port 221 of the first drainage case 220. The water in the first drainage case 220 is accumulated on the flange portion 242.

As shown in FIG. 6, when the flange portion 242 is elastically deformed due to the pressure of water, a gap is formed between the inner face of the first drainage case 220 and the flange portion 242. Thus, the water in the drainage case 210 is drained out of the rack housing through the case outlet ports 231.

In the drainage device 200, a restoring force of the flange portion 242 of the drainage valve 240 may be reduced as the flange portion 242 is deformed repeatedly. If the restoring force is significantly reduced, a gap is formed between the flange portion 242 and the inner face of the first drainage case 220 when no water is accumulated on the flange portion 242. Therefore, foreign matter may enter the housing space of the rack housing from the outside of the rack housing through the case outlet ports 231.

SUMMARY OF THE INVENTION

The invention provides a steering system that includes a drainage device configured such that the sealing performance is less likely to deteriorate.

According to a feature of an example of the invention, there is provided a steering system including a rack housing and a drainage device, wherein the drainage device includes: a drainage case having a case inlet port communicated with a housing space of the rack housing, a case outlet port communicated with an outside of the rack housing, a drainage space communicated with the case inlet port and the case outlet port, and a case bottom face that faces the drainage space; and a drainage valve arranged in the drainage space and having a hollow shape, the drainage valve having a valve body inlet port portion communicated with the case inlet portion, and a valve body outlet port portion that is made of a resin and interrupts communication between the case inlet port and the case outlet port when the valve body outlet port portion comes into contact with the case bottom face.

BRIEF DESCRIPTION OF THE DRAWINGS

The foregoing and further objects, features and advantages of the invention will become apparent from the following description of example embodiments with reference to the accompanying drawings, wherein like numerals are used to represent like elements and wherein.

DETAILED DESCRIPTION OF EMBODIMENTS

Hereinafter, embodiments of the invention will be described with reference to the accompanying drawings.

Figure 1:
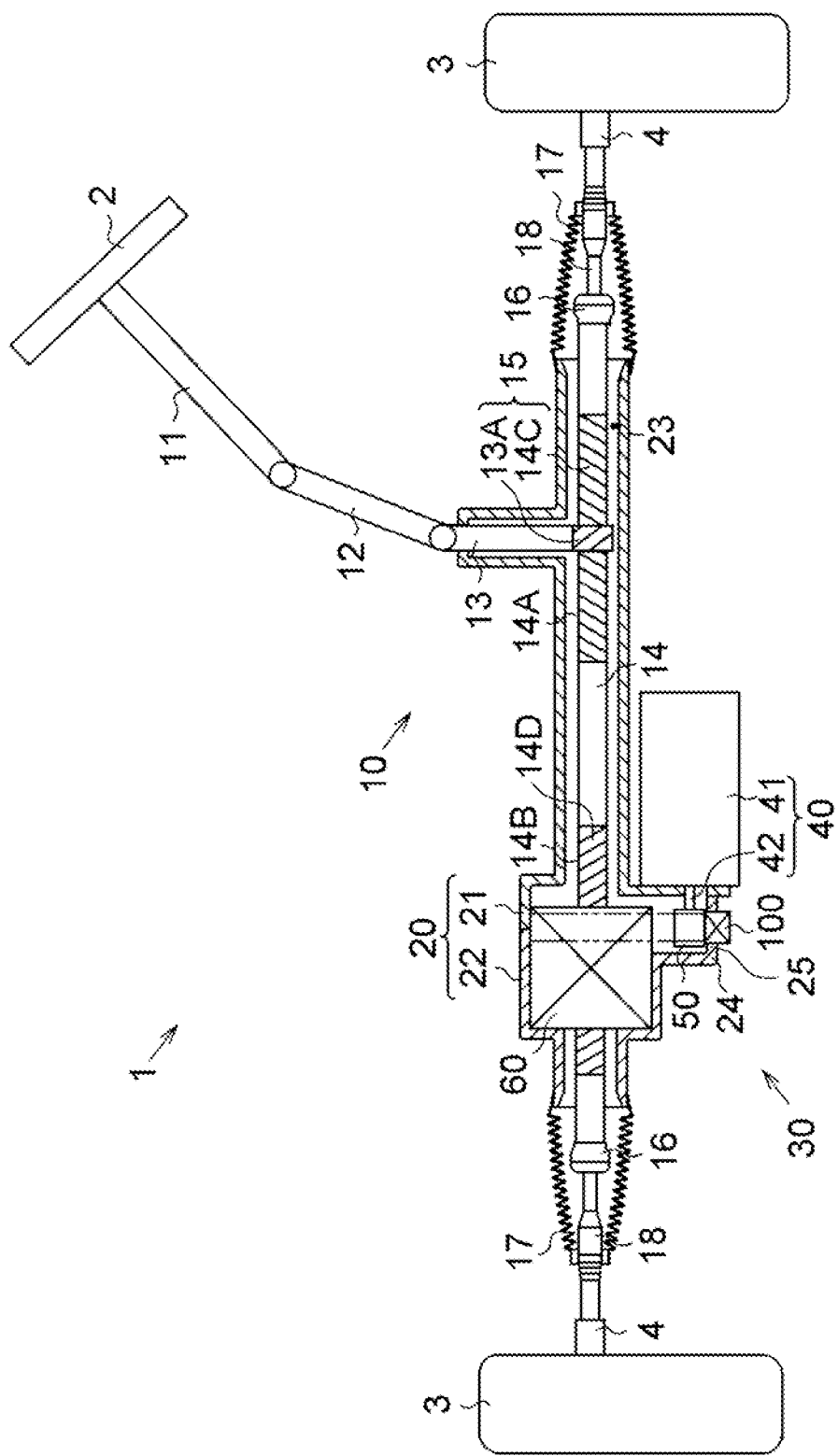
FIG. 1 is a view schematically showing the configuration of a steering system that includes a drainage device according to an embodiment of the invention.

The configuration of a steering system 1 will be described with reference to FIG. 1. The steering system I includes a steering system body 10, a rack housing 20, an assist device 30, and a drainage device 100. The steering system 1 is configured as a rack-parallel type electric power steering system, in which the assist device 30 assists an operation of a steering wheel 2.

The steering system body 10 includes a column shaft 11, an intermediate shaft 12, a pinion shaft 13, a rack shaft 14, a rack-and-pinion mechanism 15, two ball joints 16, two bellows 17, and two tie rods 18. As the steering wheel 2 is rotated, the column shaft 11, the intermediate shaft 12, and the pinion shaft 13 of the steering system body 10 are rotated together with each other. In the steering system body 10, the rack shaft 14 is moved in its longitudinal direction due to the rotation of the pinion shaft 13. In the steering system body 10, as the rack shaft 14 moves, the tie rods 18 are operated via the ball joints 16. The steering system body 10 changes the steered angle of steered wheels 3 via knuckles 4 by operating the tie rods 18.

The rack shaft 14 has a gear portion 14A and a thread formation portion 14B. The rack shaft 14 has a plurality of rack gears 14C in a predetermined range along the central axial direction within the gear portion 14A. The rack shaft 14 has an external thread that serves as a rack thread 14D in a predetermined range along the central axial direction within the thread formation portion 14B.

The rack-and-pinion mechanism 15 includes a pinion gear 13A of the pinion shaft 13, and the rack gears 14C of the rack shaft 14. The rack-and-pinion mechanism 15 converts the rotation of the pinion shaft 13 into a linear motion of the rack shaft 14.

The rack housing 20 is made of a metal material. The rack housing 20 has a first housing 21, a second housing 22 and a housing space 23. The rack housing 20 is formed by connecting the first housing 21 and the second housing 22, which are formed as separate parts, to each other. In the housing space 23, the rack housing 20 houses the pinion shaft 13, the rack shaft 14, and the ball joints 16, in addition to a speed reducer 50, a ball screw device 60 and a support device 70 that constitute the assist device 30.

The bellows 17 are made of an elastic resin material. Each of the bellows 17 is fitted to a corresponding one of the end portions of the rack housing 20 and a corresponding one of the tie rods 18. Each of the bellows 17 covers part of the rack shaft 14, which projects from the rack housing 20, a corresponding one of the ball joints 16, and a corresponding one of the tie rods 18. The bellows 17 suppress entry of foreign matter into the housing space 23 from the outside of the rack housing 20.

Figure 2:
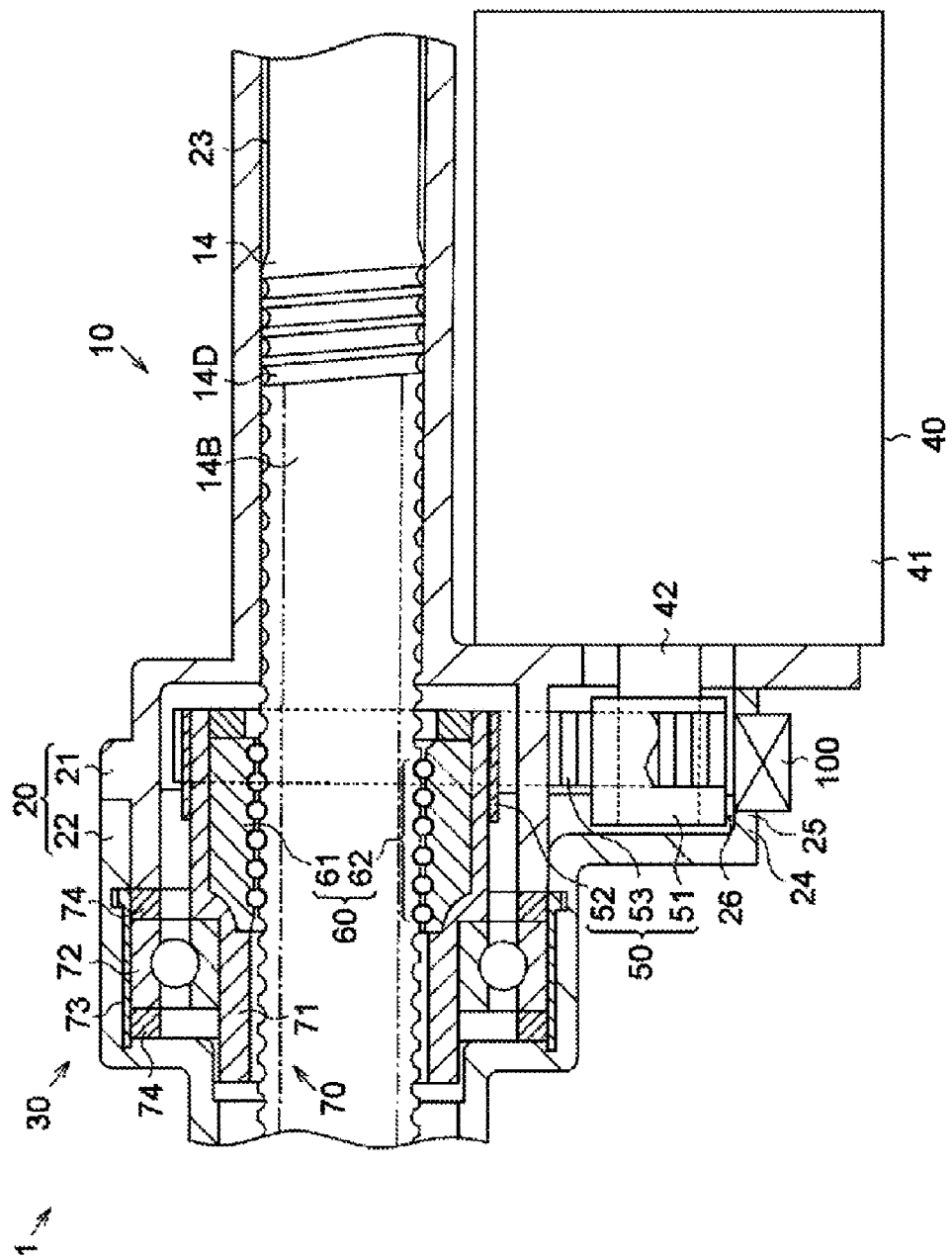
FIG. 2 is a sectional view showing the sectional configuration of the steering system in the embodiment, taken along the direction of the central axis of a rack shaft.

The assist device 30 includes an electric motor 40, the speed reducer 50, the ball screw device 60, and the support device 70 (see FIG. 2). In the assist device 30, as the rotation of the electric motor 40 is transmitted to the ball screw device 60 via the speed reducer 50 to rotate the ball screw device 60, a force that acts in the central axial direction of the rack shaft 14 is applied to the rack shaft 14.

The drainage device 100 is fitted to a valve fixing portion 25 of the second housing 22. The drainage device 100 drains water, which has entered the housing space 23 of rack housing 20, from out of the rack housing 20.

The detailed configuration of the assist device 30 will be described with reference to FIG. 2. The electric motor 40 is fitted to the outer face of the rack housing 20. The electric motor 40 includes a motor body 41 and a motor shaft 42. When the motor body 41 is fixed to the first housing 21, the position of the electric motor 40 relative to the rack housing 20 is fixed. The electric motor 40 rotates the ball screw device 60 via the speed reducer 50.

The motor shaft 42 is arranged across the motor body 41 and the housing space 23 of the rack housing 20. The rotation central axis of the motor shaft 42 is parallel to the central axis of the rack shaft 14. The motor shaft 42 rotates as electric current is supplied to the motor body 41.

The ball screw device 60 is fitted to the outer periphery of the thread formation portion 14B of the rack shaft 14. The ball screw device 60 rotates relative to the rack shaft 14 about the central axis of the rack shaft 14. The ball screw device 60 includes a nut 61, and balls 62. In the ball screw device 60, a force that acts in the central axial direction of the rack shaft 14 is applied to the rack shaft 14 by the rotation of the nut 61.

The speed reducer 50 is arranged across the motor shaft 42 and the nut 61. The speed reducer 50 includes a drive pulley 51, a driven pulley 52, and a transmission belt 53. In the speed reducer 50, the drive pulley 51 is fixed to the motor shaft 42. In the speed reducer 50, the driven pulley 52 is fixed to a rotational support member 71. In the speed reducer 50, the transmission belt 53 is looped over the drive pulley 51 and the driven pulley 52. In the speed reducer 50, the speed of rotation of the drive pulley 51 is reduced by the driven pulley 52.

The support device 70 is arranged around the thread formation portion 14B of the rack shaft 14 and the ball screw device 60. The support device 70 includes the rotational support member 71, a bearing 72, a radial support member 73, and two thrust support members 74. The support device 70 supports rotation of the nut 61 relative to the rack housing 20 and the rack shaft 14.

The rotational support member 71 is made of a metal material. The rotational support member 71 has a cylindrical shape. The rotational support member 71 is fixed to the outer periphery of the nut 61. The rotational support member 71 rotates relative to the rack shaft 14 about the central axis of the rack shaft 14 as the transmission belt 53 turns.

The bearing 72 is made of a metal material. An inner ring of the bearing 72 is fixed to the outer periphery of the rotational support member 71. The bearing 72 rotates relative to the rack shaft 14 about the central axis of the rack shaft 14.

The radial support member 73 is made of an elastic resin material. The radial support member 73 has an annular shape. The radial support member 73 is fitted onto the outer periphery of an outer ring of the bearing 72. The radial support member 73 is arranged between the outer ring of the bearing 72 and the rack housing 20 while being compressed radially.

The thrust support members 74 are made of an elastic resin material. Each of the thrust support members 74 has an annular shape. The thrust support members 74 are arranged between end faces of the outer ring of the bearing 72 and the rack housing 20 while being compressed radially.

The second housing 22 has a housing bottom wall portion 24. At the housing bottom wall portion 24, the second housing 22 faces the drive pulley 51 and the transmission belt 53 via a gap 26.

The operation of the assist device 30 will be described. The assist device 30 rotates the motor shaft 42 of the electric motor 40 and the drive pulley 51 in response to the rotation of the steering wheel 2 (see FIG. 1). The drive pulley 51 rotates the driven pulley 52, the rotational support member 71, and the nut 61 via the transmission belt 53. The nut 61 applies a force which acts in the central axial direction of the rack shaft 14, to the rack shaft 14 via the balls 62.

The configuration of a characterizing part of the invention will be described with reference to FIG. 3. The drainage device 100 includes a drainage case 110, a drainage valve 160, and a seal ring 190. The drainage device 100 is formed by connecting the drainage case 110, the drainage valve 160, and the seal ring 190, which are formed as separate parts, to each other.

The drainage case 110 has a first drainage case 120, a second drainage case 150, and a drainage space 111. The drainage case 110 is formed by connecting the first drainage case 120 and the second drainage case 150, which are formed as separate parts, to each other.

The first drainage case 120 is made of a resin material. The first drainage case 120 has a stepped shape. The first drainage case 120 is fitted to the valve fixing portion 25 of the second housing 22. The first drainage case 120 has a case upper portion 130 and a case lower portion 140. The first drainage case 120 has a configuration in which the case upper portion 130 and the case lower portion 140 are made of the same resin material and formed into a single-piece member.

The case upper portion 130 has a cylindrical shape. The case upper portion 130 has an upper peripheral wall portion 131, a case inlet port 132, a case thread 133, a ring groove 134, and an upper space 135. The case upper portion 130 is screwed into the valve fixing portion 25 of the second housing 22, at the case thread 133 that is formed on an outer periphery 136 of the case upper portion 130. In the case upper portion 130, the upper space 135 is defined by an inner periphery 137 of the upper peripheral all portion 131. The upper space 135 of the case upper portion 130 and the housing space 23 of the rack housing 20 are communicated with each other through the case inlet port 132.

The case lower portion 140 has a hexagonal shape. The case lower portion 140 has a lower peripheral wall portion 141, a rib portion 142, an open portion 143, an insertion portion 144, and a lower space 145. The case lower portion 140 is fitted to the valve fixing portion 25 with an outer periphery 146 of the case lower portion 140 located outside the second housing 22. In the case lower portion 140, a lower space 145 is defined by an inner periphery 147 of the lower peripheral wall portion 141.

The second drainage case 150 is made of a resin material. The second drainage case 150 has a hexagonal shape that corresponds to the case lower portion 140. The second drainage case 150 has a fitting peripheral wall portion 151, a bottom wall portion 152, a convex portion 153, a plurality of case outlet ports 154, and an inner space 155. The second drainage case 150 is fitted to the first drainage case 120 with an outer periphery 156 of the second drainage case 150 facing the inner periphery 147 of the case lower portion 140. The second drainage case 150 is fixed to the first drainage case 120 when a restricting portion 151A of the fitting peripheral wall portion 151 is press-fitted to the inner periphery 147 of the case lower portion 140. In the second drainage case 150, the inner space 155 is defined by an inner periphery 157 of the fitting peripheral wall portion 151. The inner space 155 of the second drainage case 150 and a space outside the rack housing 20 are communicated with each other through the case outlet ports 154.

The convex portion 153 is shaped such that the convex portion 513 projects upward in the height direction, that is, the height of the convex portion 513 increases from the outer side toward the center of the second drainage case 150 in the radial direction. The convex portion 153 has a convex seal face 153A that serves as the bottom face of the case. In the convex portion 153, the convex seal face 153A is inclined gently from the center of the convex portion 153 toward the bottom wall portion 152. At the convex seal face 153A, the convex portion 153 contacts the drainage valve 160. The convex portion 153 guides water from the convex seal face 153A to each of the case outlet ports 154.

The case outlet ports 154 pass through the bottom wall portion 152. The case outlet ports 154 are formed at equal internals about the central axis of the second drainage case 150. Each of the case outlet ports 154 is formed at a position that is lower than the convex seal face 153A of the convex portion 153 in the height direction of the second drainage case 150.

The drainage space 111 has the upper space 135 of the case upper portion 130, the lower space 145 of the case lower portion 140, and the inner space 155 of the second drainage case 150. The drainage space 111 provides communication between the case inlet port 132 and the case outlet ports 154.

The seal ring 190 is made of an elastic resin material. The seal ring 190 has an annular shape. The seal ring 190 is fitted into the ring groove 134 of the first drainage case 120. The seal ring 190 provides sealing between the valve fixing portion 25 of the second housing 22 and the outer periphery 136 of the first drainage case 120.

The drainage valve 160 is made of an elastic resin material with an elasticity higher than that of the resin material of the drainage case 110. The drainage valve 160 has a hollow shape. The drainage valve 160 is arranged in the drainage space 111. The drainage valve 160 is fixed to the drainage case 110. The drainage valve 160 has a valve body inlet port portion 170 and a valve body outlet port portion 180. The drainage valve 160 has a configuration in which the valve body inlet port portion 170 and the valve body outlet port portion 180 are made of the same resin material and formed into a single-piece member. The drainage valve 160 allows or interrupts communication between the case inlet port 132 and the case outlet ports 154 of the drainage case 110.

The valve body inlet port portion 170 has a cylindrical shape. The valve body inlet port portion 170 is fitted to the insertion portion 144 of the first drainage case 120. The valve body inlet port portion 170 is arranged across the upper space 135 of the first drainage case 120 and the inner space 155 of the second drainage case 150. The valve body inlet port portion 170 has an inlet port body portion 171, an inlet port projecting portion 172, and a valve body inlet port space 173. The upper space 135 of the first drainage case 120 and the inner space 155 of the second drainage case 150 are communicated with each other through the valve body inlet port space 173 of the valve body inlet port portion 170.

A portion of an outer periphery 174 of the inlet port body portion 171 is pressed against the inner periphery of the insertion portion 144 of the first drainage case 120. The valve body inlet port portion 170 is fixed to the first drainage case 120 by a restoring force that is generated as the inlet port body portion 171 is pressed against the inner periphery of the insertion portion 144. The valve body inlet port space 173 is defined by an inner periphery 175 of the inlet port body portion 171.

The inlet port projecting portion 172 has a flange shape. The inlet port projecting portion 172 is arranged in the upper space 135 of the first drainage case 120. The inlet port projecting portion 172 has an outer diameter larger than the diameter of an opening of the insertion portion 144 of the first drainage case 120. The outer diameter of the inlet port projecting portion 172 is largest at the central part of the inlet port projecting portion 172 in its height direction.

The valve body outlet port portion 180 has a tapered and hollow shape. The valve body outlet port portion 180 is arranged in the inner space 155 of the second drainage case 150. The valve body outlet port portion 180 has an outlet port contact portion 181, an outlet port intermediate portion 182, and a valve body outlet port space 183. The valve body outlet port portion 180 contacts the convex portion 153 with an outer periphery 184 of the valve body outlet port portion 180 facing the rib portion 142 and the insertion portion 144 of the first drainage case 120 via a space. In the valve body outlet port portion 180, the valve body outlet port space 183 is defined by the inner periphery 185 of the valve body outlet port portion 180.

The inner periphery 185 has a valve body seal face 185A of the outlet port contact portion 181 and a valve body opposing face 185B of the outlet port intermediate portion 182. The valve body seal face 185A of the inner periphery 185 is pressed against the convex seal face 153A of the convex portion 153. There is a gap between the valve body opposing face 185B of the inner periphery 185 and the convex seal face 153A.

Because the outlet port contact portion 181 is pressed against the convex seal face 153A, the inner diameter of the outlet port contact portion 181 is larger than that of the outlet port contact portion 181 in a state where the drainage valve 160 is not fitted to the drainage case 110. The outlet port contact portion 181 comes into close contact with the convex seal face 153A due to a resorting force generated as the outlet port contact portion 181 is pressed against the convex seal face 153A. The outlet port contact portion 181 interrupts communication between the valve body outlet port space 183 and the inner space 155 of the second drainage case 150 as the outlet port contact portion 181 comes into close contact with the convex seal face 153A.

The operation and advantageous effects of the drainage device 100 will be described with reference to FIG. 1 to FIG. 4. In the steering system 1 shown in FIG. 1, when the bellows 17 on the first housing 21 side is broken, water enters an inside space of the bellows 17 from the outside of the steering system 1 through a broken part of the bellows 17. The water enters the housing space 23 from the inside space of the bellows 17 through an opening of the first housing 21. In the steering system 1, when the bellows 17 on the second housing 22 side is broken, water enters an inside space of the bellows 17 from the outside of the steering system 1 through a broken part of bellows 17. The water enters the housing space 23 from the inside space of the bellows 17 through an opening of the second housing 22.

In the rack housing 20 shown in FIG. 2, the water that has entered the housing space 23 moves on the wall face of the first housing 21 or the second housing 22, and moves to the wall face of the housing bottom wall portion 24 of the second housing 22.

Figure 3:
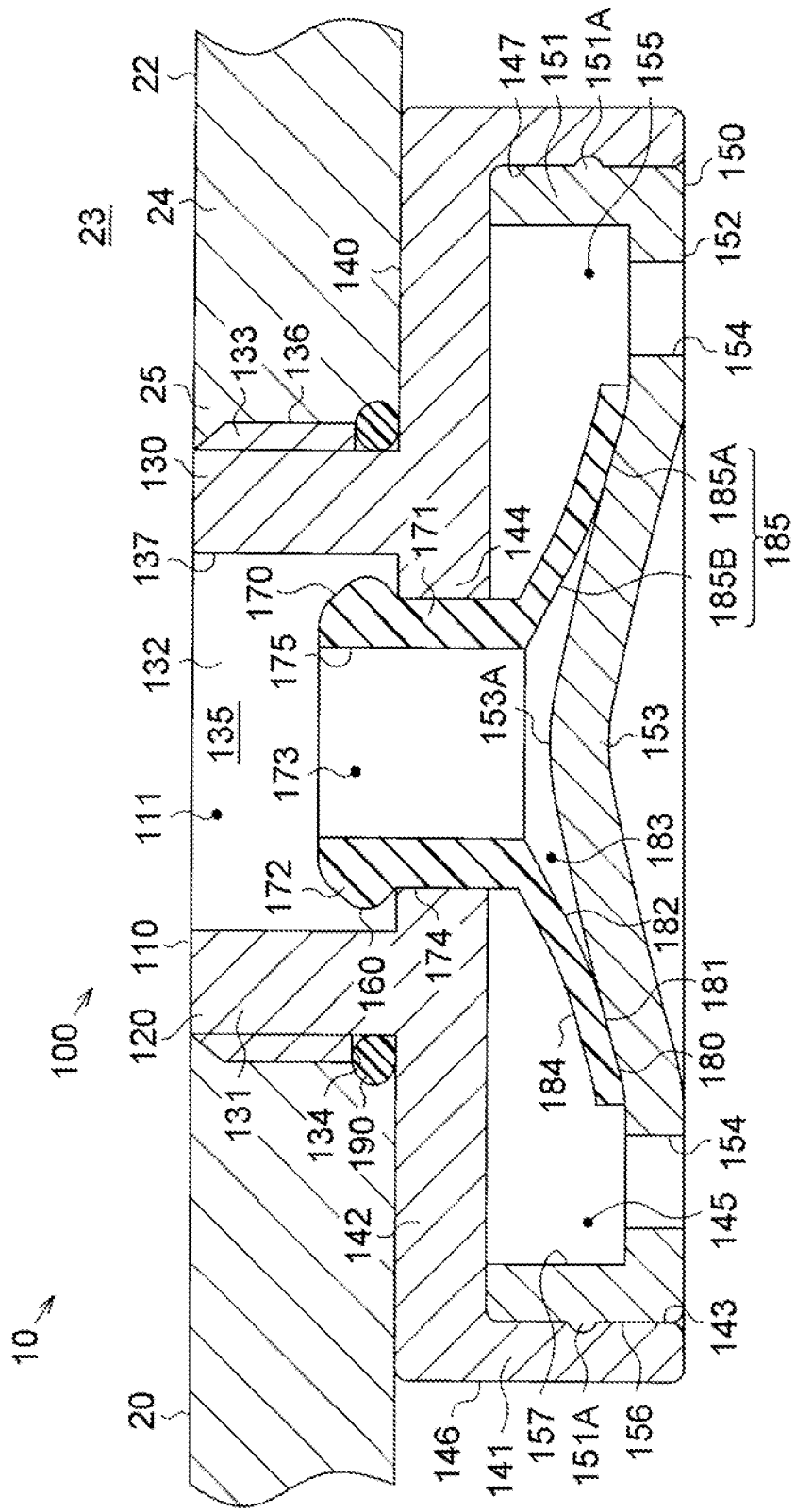
FIG. 3 is a sectional view showing the sectional configuration of the drainage device according to the embodiment in a state where a drainage valve is closed.

In the rack housing 20 shown in FIG. 3, the water flows from the wall face of the housing bottom wall portion 24 into the upper space 135 of the first drainage case 120 (the drainage space 111 of the drainage case 110) through the case inlet port 132 of the drainage case 110. The water flows from the upper space 135 of the first drainage case 120 into an inner space of the drainage valve 160 (the valve body inlet port space 173) through the valve body inlet port portion 170. The water flows from the valve body inlet port space 173 into the valve body outlet port space 183. The water flows from the valve body outlet port space 183 into the gap between the outlet port intermediate portion 182 of the valve body outlet port portion 180 and the convex portion 153.

The water accumulated on the convex portion 153 in the valve body outlet port space 183 applies a pressure to the value body outlet port portion 180. When a pressure of water received by the outlet port contact portion 181 is smaller than a certain pressure, the valve body outlet port portion 180 stays in close contact with the convex seal face 153A of the convex portion 153. When the outlet port contact portion 181 is in close contact with the convex portion 153, the valve body outlet port portion 180 interrupts communication between the valve body outlet port space 183 and the inner space 155 of the second drainage case 150. In other words, the valve body outlet port portion 180 interrupts communication between the case inlet port 132 and the case outlet ports 154 of the drainage case 110.

Figure 4:
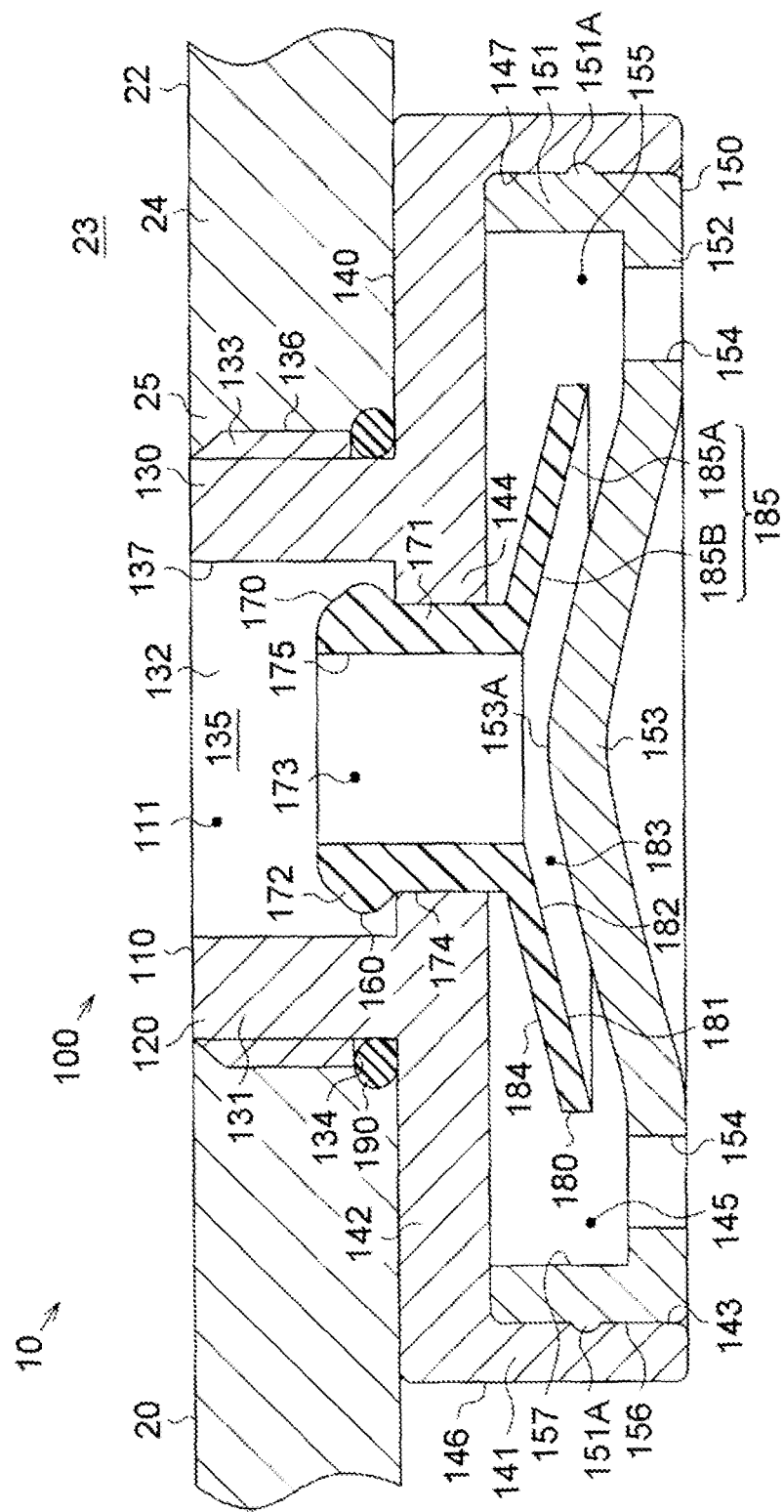
FIG. 4 is a sectional view showing the sectional configuration of the drainage device according to the embodiment in a state where the drainage valve is open.

In the rack housing 20 shown in FIG. 4, when a pressure of water received by the outlet port contact portion 181 is equal to or larger than the certain pressure, the valve body outlet port portion 180 is deformed in such a direction that the outlet port contact portion 181 is separated from convex seal face 153A. When the outlet port contact portion 181 is separated from the convex seal face 153A, the valve body outlet port portion 180 provides communication between the valve body outlet port space 183 and the inner space 155 of the second drainage case 150. In other words, the valve body outlet port portion 180 provides communication between the case inlet port 132 and the case outlet ports 154 of the drainage case 110. Accordingly, the water accumulated on the convex portion 153 is guided to the case outlet ports 154 by the convex seal face 153A. Then, the water that has reached the case outlet ports 154 is drained out of the drainage space 111 of the drainage case 110 through the case outlet ports 154. In this way, the drainage device 100 drains the water from the housing space 23 of the rack housing 20 to the outside of the rack housing 20.

The steering system 1 according to the present embodiment provides the following advantageous effects.

(1) The steering system 1 includes the drainage device 100. With this configuration, the water that has entered the housing space 23 of the rack housing 20 flows into the valve body inlet port space 173 (the drainage space 111) through the case inlet port 132. The water flows from the valve body inlet port space 173 into the valve body outlet port space 183 (the drainage space 111). The water in the valve body outlet port space 183 is accumulated on the convex portion 153. When the valve body outlet port portion 180 is elastically deformed due to a pressure from the water, a gap is formed between the convex portion 153 and the outlet port contact portion 181. Thus, the water is drained from the valve body outlet port space 183 (the drainage space 111) to the outside of the rack housing 20 through the case outlet ports 154.

Figure 5:
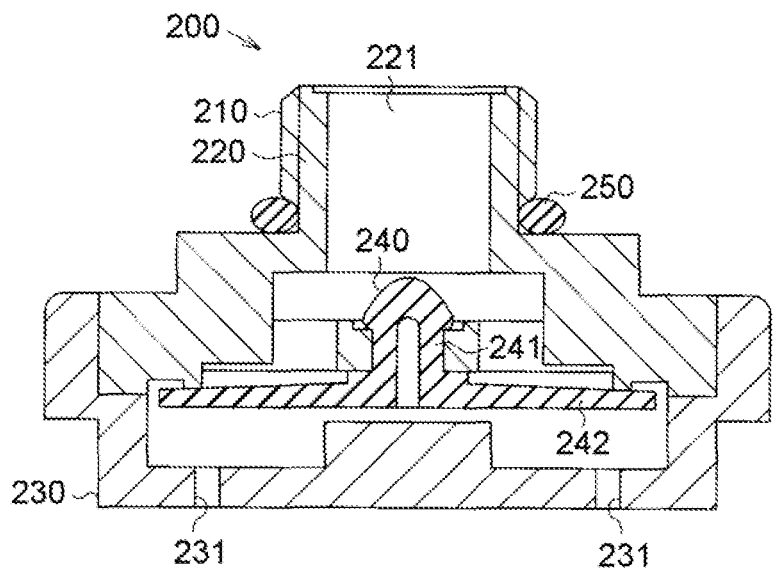
FIG. 5 is a sectional view showing the sectional configuration of a drainage device in related art in a state where a drainage valve is closed.
Figure 6:
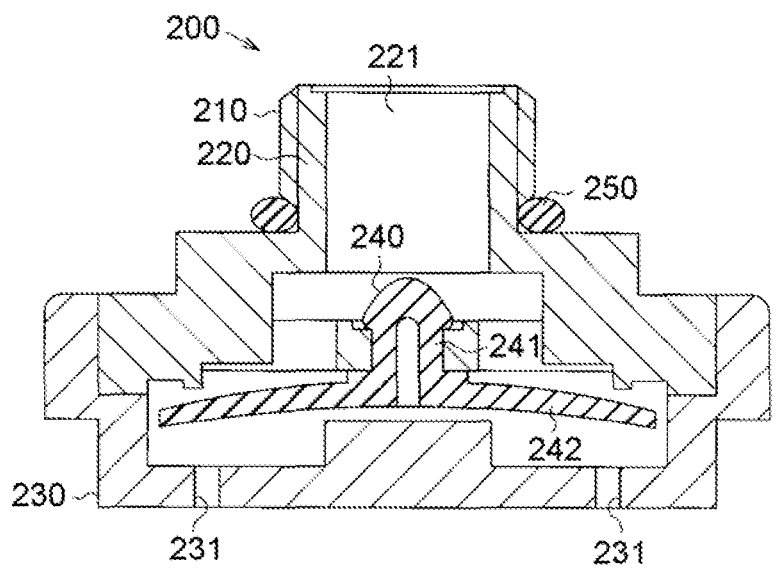
FIG. 6 is a sectional view showing the sectional configuration of the drainage device in related art in a state where the drainage valve is open.

(2) The drainage device 100 includes the drainage valve 160 that has a hollow shape. The valve body outlet port portion 180 of the drainage valve 160, which has a tapered and hollow shape, provides or interrupts communication between the case inlet port 132 and the case outlet ports 154. With this configuration, a reduction in restoring force of the drainage valve 160 due to repeated deformation is less likely to occur as compared to the conventional drainage device 200 shown in FIG. 5 and FIG. 6, that is, the drainage device 200 in which the flange portion 242 provides or interrupts communication between the case inlet port 221 and the case outlet ports 231. Thus, deterioration of the sealing performance of the drainage valve 160 is suppressed.

(3) The drainage device 100 has a configuration in which the outlet port contact portion 181 of the valve body outlet port portion 180 is in close contact with the convex portion 153 of the second drainage case 150. With this configuration, the situation where foreign matter enters the housing space 23 from the outside of the rack housing 20 through the drainage device 100 is less likely to occur.

(4) The drainage device 100 has the valve body outlet port portion 180 having a tapered and hollow shape. With this configuration, the valve body outlet port portion 180 is deformed by a pressure of water more easily as compared to a configuration in which the valve body outlet port portion 180 does not have a tapered shape. Thus, the drainage performance of the drainage device 100 is improved. Even if a dimensional tolerance is increased, the valve body outlet port portion 180 reliably comes into close contact with the second drainage case 150 as compared to the configuration where the valve body outlet port portion 180 does not have a tapered shape. Therefore, the dimensional management of the drainage valve 160 is facilitated.

(5) In the drainage device 100, there is a gap between the outlet port intermediate portion 182 of the valve body outlet port portion 180 and the convex portion 153. With this configuration, because the water that has flown into the drainage case 110 is accumulated between the outlet port intermediate portion 182 and the convex portion 153, the outlet port contact portion 181 is easily separated from the convex portion 153 due to a pressure of the water. Thus, the drainage performance of the drainage device 100 is improved.

(6) The drainage device 100 has the convex portion 153. With the configuration, the water accumulated in the valve body outlet port space 183 (on the inner side of the drainage valve 160) easily flows toward the case outlet ports 154. Therefore, the drainage performance of the drainage device 100 is improved.

(7) The drainage device 100 is fixed to the rack housing 20 at the case thread 133 of the drainage case 110. With this configuration, the drainage case 110 is fitted to the rack housing 20 easily.

(8) The drainage device 100 has the seal ring 190. With this configuration, a gap between the drainage case 110 and the rack housing 20 is sealed by the seal ring 190. Thus, entry of the water into the housing space 23 through the gap between the drainage case 110 and the rack housing 20 is suppressed.

(9) In the steering system 1 shown in FIG. 1, operation failures of the steering system body 10 and the assist device 30 while a vehicle travels are less likely to occur, as compared to a steering system as a comparative example (hereinafter referred to as "virtual steering system"). Details of a problem that is likely to occur in the virtual steering system will be described below. The virtual steering system is different from the steering system 1 in that the drainage device 100 is omitted, and the other configuration is the same as that of the steering system 1. Therefore, elements of the virtual steering system, which are common to those of the steering system 1, will be indicated by the same reference numerals as those for the steering system 1.

In the virtual steering system, the water that has entered the housing space 23 of the rack housing 20 may be solidified in the housing space 23. Solidification of the water occurs through, for example, a first process, a second process, a third process, or a fourth process.

In the first process, when water enters the housing space 23 while a vehicle is travelling and then the vehicle enters a cool environment from a thermally neutral environment as the vehicle continues to travel after the entry of the water into the housing space 23, the water in the housing space 23 is solidified due to a decrease in the ambient temperature. In the first process, solidification of the water is more likely to occur if the frequency of operation of the steering wheel 2 after the entry of the water into the housing space 23 is lower. Typically, when the vehicle continues to travel straight ahead over a long distance after the water entered the housing space 23, the water in the housing space 23 is solidified.

In the second process, when water enters the housing space 23 while the vehicle is stopped and then the vehicle enters the cool environment from the thermally neutral environment as the vehicle travels after the entry of the water into the housing space 23, the water in the housing space 23 is solidified due to a decrease in the ambient temperature. In the second process, solidification of the water is more likely to occur if the frequency of operation of the steering wheel 2 after the entry of the water into the housing space 23 is lower. Typically, when the vehicle continues to travel straight ahead over a long distance after the water entered the housing space 23, the water in the housing space 23 is solidified.

In the third process, when water enters the housing space 23 while the vehicle is travelling and then the ambient temperature decreased while the vehicle is stopped after the entry of the water into the housing space 23, the water in the housing space 23 is solidified due to a decrease in the ambient temperature the third process, solidification of water is more likely to occur if the vehicle stopping time after the entry of the water into the housing space 23 is longer.

In the fourth process, when water enters the housing space 23 while the vehicle is stopped and then the ambient temperature is decreased while the vehicle is stopped after the entry of the water into the housing space 23, the water in the housing space 23 is solidified due to a decrease in the ambient temperature. In the fourth process, solidification of water is more likely to occur if the vehicle stopping time after the entry of the water into the housing space 23 is longer.

Then, when the water is solidified at the housing bottom wall portion 24 of the rack housing 20, the transmission belt 53 of the speed reducer 50 may be frozen as the water is solidified. In the case where the transmission belt 53 is frozen, the rotation of the nut 61 is restricted by the transmission belt 53, and the movement of the rack shaft 14 is thus restricted. Thus, when the steering wheel 2 is operated in a state where the vehicle is travelling and the transmission belt 53 is frozen, the rack shaft 14 does not move. Accordingly, the steered angle of the steered wheels 3 does not change. Hence, a larger steering torque is input into the steering wheel 2. When a steering torque that is input into the steering wheel 2 is larger than a predetermined torque, the transmission belt 53 may be broken due to the torque that acts on the nut 61 via the rack shaft 14. When the transmission belt 53 is broken, the movement of the rack shaft 14 is no longer restricted by the nut 61, and the movement of the rack shaft 14 in accordance with an operation of the steering wheel 2 is permitted. On the other hand, because the rotation of the electric motor 40 is not transmitted to the nut 61, the electric motor 40 stops assisting the operation of the steering wheel 2.

As described above, in the virtual steering system, operation failures of the steering system body 10 and the assist device 30 may occur due to solidification of the water in the housing space 23 while the vehicle is travelling or stopped.

Because the steering system 1 has the drainage device 100, the water that has entered the housing space 23 is drained. Therefore, solidification of the water in the housing space 23, and freezing of the transmission belt 53 due to the solidification of water are less likely to occur. Hence, as compared to the virtual steering system, operation failures of the steering system body 10 and the assist device 30 are less likely to occur while the vehicle is travelling.

(10) In the virtual steering system, because it is difficult to drain the water from the housing space 23, corrosion of the steering system body 10, the rack housing 20, and the assist device 30 may be promoted even when the water that has entered the housing space 23 is not solidified. On the other hand, in the steering system 1, the water in the housing space 23 is drained by the drainage device 100. Therefore, when the water that has entered the housing space 23 is not solidified, progress of the corrosion of the steering system body 10, the rack housing 20, and the assist device 30 is suppressed.

The invention includes embodiments other than the foregoing embodiment. Modified examples of the foregoing embodiment will be described below as other embodiments of the invention. The modified examples described below may be combined with each other.

The drainage valve 160 in the above-described embodiment has a configuration in which the valve body inlet port portion 170 and the valve body outlet port portion 180 are made of the same resin material and formed into a single-piece member. On the other hand, the drainage valve 160 in a modified example has any one of the configurations (a) to (c) below.

(a) The drainage valve 160 in the modified example has a configuration in which the valve body inlet port portion 170 and the valve body outlet port portion 180, which are formed as separate parts, are connected to each other. The drainage valve 160 in the modified example (a) has the valve body inlet port portion 170 and the valve body outlet port portion 180 that are made of the same resin material.

(b) The drainage valve 160 in the modified example (b) has the same configuration as that of the drainage valve 160 in the modified example (a) except that the valve body inlet port portion 170 and the valve body outlet port portion 180 are made of resin materials different from each other. The valve body outlet port portion 180 is made of at elastic resin material having an elasticity higher than that of a material of the valve body inlet port portion 170.

(c) The drainage valve 160 in the modified example (c) has the same configuration as that of the drainage valve 160 in the modified example (a) except that the valve body inlet port portion 170 is made of a material other than a resin material (for example, a metal material) and the valve body outlet port portion 180 is made of elastic resin material.

(d) The drainage valve 160 in the modified example (d) has the same configuration as that of any one of the foregoing modified examples (a) to (c) except that the valve body inlet port portion 170 is formed by connecting a plurality of parts, which are formed as separate parts, to each other.

(e) The drainage valve 160 in the modified example (e) has the same configuration as that of any one of the foregoing modified examples (a) to (d) except that the valve body outlet port portion 180 is formed by connecting a plurality of parts, which are formed as separate parts, to each other.

The drainage device 100 according to the above-described embodiment has a configuration in which the drainage case 110 is fixed to the rack housing 20 when the case thread 133 of the case upper portion 130 is screwed to the valve fixing portion 25. On the other hand, the drainage device 100 in a modified example has a configuration described in (a) or (b) below.

(a) The drainage device 100 in the modified example (a) has a configuration in which a drainage case 110 is fixed to the rack housing 20 when the case upper portion 130 is press-fitted to the valve fixing portion 25. In the drainage device 100 in this modified example, the case thread 133 of the case upper portion 130 is omitted.

(b) The drainage device 100 in the modified example (b) has a bolt fastening portion at the drainage case 110, and the case thread 133 of the case upper portion 130 is omitted. The drainage device 100 in this modified example is fixed to the housing bottom wall portion 24 by a bolt that is screwed across the bolt fastening portion and the housing bottom wall portion 24.

The drainage device 100 in the above-described embodiment has a configuration in which the case upper portion 130 is arranged on the inner side of the housing bottom wall portion 24, and the case lower portion 140 is arranged outside the rack housing 20. On the other hand, the drainage device 100 in a modified example has any one of the configurations described in (a) to (d) below.

(a) The drainage device 100 in the modified example (a) has a configuration in which the case upper portion 130 and the case lower portion 140 are arranged on the inner side of the housing bottom wall portion 24. The drainage device 100 in this modified example has the case lower portion 140 having a cylindrical shape.

(b) The drainage device 100 in the modified example (b) has the same configuration as that of the drainage device 100 in the modified example (a) except that the drainage device 100 in the modified example (b) has an external thread at the outer periphery 146 of the case lower portion 140 instead of, or in addition to the case thread 133 of the case upper portion 130.

(c) The drainage device 100 in the modified example (c) has the same configuration as that of the drainage device 100 in the modified example (a) except that the drainage device 100 in the modified example (c) has a configuration in which the case upper portion 130 and the case lower portion 140 are press-fitted to the housing bottom wall portion 24. In the drainage device 100 in this modified example, threads of the case upper portion 130 and the case lower portion 140 are omitted.

(d) The drainage device 100 in the modified example (d) has the same configuration as that of any one of the modified examples (a) to (c) except that the drainage device 100 in the modified example (d) has a configuration in which the case upper portion 130 projects into the housing space 23 from the housing bottom wall portion 24.

The drainage device 100 in the modified example (e) has the same configuration as that of the modified example (d) except that the drainage device 100 in the modified example (e) has a hole that is formed in a portion of the case upper portion 130, which is located at the housing space 23, and that passes through the upper peripheral wall portion 131. With this configuration, the water on the wall face of the housing bottom wall portion 24 easily flows into the upper space 135 of the case upper portion 130.

The drainage device 100 in the above-described embodiment has the case lower portion 140 having a hexagonal shape. On the other hand, the drainage device 100 in a modified example has the case lower portion 140 with a shape other than a hexagonal shape (for example, a polygonal shape other than a hexagonal shape, or a cylindrical shape).

The drainage device 100 in the above-described embodiment has a configuration in which the seal ring 190 is fitted to the outer periphery 136 of the case upper portion 130. On the other hand, the drainage device 100 in a modified example has a configuration in which the seal ring 190 is fitted to the outer periphery 146 of the case lower portion 140.

The drainage case 110 in the above-described embodiment has a configuration in which the fitting peripheral wall portion 151 of the second drainage case 150 is fitted into the inner periphery 147 of the first drainage case 120. On the other hand, the drainage case 110 in a modified example has a configuration in which the fitting peripheral wall portion 151 of the second drainage case 150 is fitted into the outer periphery 146 of the first drainage case 120.

The drainage case 110 in the above-described embodiment has the convex portion 153 at the second drainage case 150. On the other hand, the drainage case 110 in a modified example has a configuration in Which the convex portion 153 is omitted from the second drainage case 150. Instead of the convex portion 153, the second drainage case 150 has a wall portion that forms a part of the second drainage case 150. The wall portion has, for example, a flat face shape, or a curved shape that projects upward in the height direction of the second drainage case 150.

The drainage case 110 in the above-described embodiment has the case outlet ports 154 at the bottom wall portion 152 of the second drainage case 150. On the other hand, instead of or in addition to the case outlet ports 154, the drainage case 110 in a modified example has a case outlet port that passes through the lower peripheral wall portion 141 of the first drainage case 120 and the fitting peripheral wall portion 151 of the second drainage case 150.

The drainage case 110 in the above-described embodiment has the case upper portion 130 having a stepped shape. On the other hand, the drainage case 110 in a modified example has the case upper portion 130 having a columnar shape without a step.

The drainage valve 160 in the above-described embodiment has the valve body inlet port portion 170 having a cylindrical shape, and the valve body outlet port portion 180 having a tapered and hollow shape. On the other hand, the drainage valve 160 in a modified example has any one of the configurations described in (a) to (c) below.

(a) The drainage valve 160 in the modified example (a) has the valve body inlet port portion 170 having a cylindrical shape, and the valve body outlet port portion 180 having a cylindrical shape. In the drainage valve 160 in this modified example, the inner diameters and the outer diameters of the valve body inlet port portion 170 and the valve body outlet port portion 180 are the same or different from each other.

(b) In the drainage valve 160 in the modified example (b), at least one of the valve body inlet port portion 170 and the valve body outlet port portion 180 has a hollow shape other than a cylindrical shape. The hollow shapes other than a cylindrical shape include, for example, a hollow shape having a prism shape, and a hollow shape having a columnar shape other than a cylindrical shape.

(c) The drainage valve 160 in the modified example (c) has the valve body inlet port portion 170 and the valve body outlet port portion 180 that have a tapered shape. The drainage valve 160 in this modified example has a configuration in which the valve body inlet port portion 170 and the valve body outlet port portion 180 are continuous with each other and form a single tapered shape, or a configuration in which the valve body inlet port portion 170 and the valve body outlet port portion 180 form tapered shapes different from each other.

The drainage case 110 in the above-described embodiment has configuration in which the first drainage case 120 and the second drainage case 150 are formed as separate parts and made of the same resin material. On the other hand, the drainage case 110 in a modified example has any one of the configurations described in (a) to (g) below.

(a) The drainage case 110 in the modified example (a) has the first drainage case 120 made of a resin material, and the second drainage case 150 made of a different kind of resin material from the resin material for the first drainage case 120.

(b) The drainage case 110 in the modified example (b) has the first drainage case 120 made of a material other than a resin material (for example, a metal material), and the second drainage case 150 made of a resin material.

(c) The drainage case 110 in the modified example (c) has the first drainage case 120 made of a resin material, and the second drainage case 150 made of a material other than a resin material (for example, a metal material).

(d) The drainage case 110 in the modified example (d) has a configuration in which the first drainage case 120 and the second drainage case 150 are made of the same resin material and formed into a single-piece member. The drainage case 110 in this modified example has a configuration in which the drainage valve 160 is inserted from the case inlet port 132 of the first drainage case 120, and the valve body inlet port portion 170 is fixed to at least one of the first drainage case 120 and the second drainage case 150.

(e) The drainage case 110 in the modified example (e) has a configuration in which the first drainage case 120 and the second drainage case 150 are made of the same material that is other than a resin material (for example, a metal material) and formed into a single-piece member. The drainage case 110 in this modified example has a configuration in which the drainage valve 160 is inserted from the case inlet port 132 of the first drainage case 120, and the valve body inlet port portion 170 is fixed to at least one of the first drainage case 120 and the second drainage case 150.

(f) The drainage case 0 in the modified example (f) has the same configuration as that of the drainage case 110 the above-described embodiment or the drainage case 110 in any one of the foregoing modified examples (a) to (c), except that the drainage case 110 in the modified example (f) has the first drainage case 120 that is formed by connecting a plurality of parts, which are formed as separate parts, to each other.

(g) The drainage case 110 in the modified example (g) has the same configuration as that of the drainage case 110 in the above-described embodiment or the drainage case 110 in any one of the foregoing modified examples (a) to (c) and (f), except that the drainage case 110 in the modified example (g) has the second drainage case 150 that is formed by connecting a plurality of parts, which are formed as separate pans, to each other.

The steering system 1 in the above-described embodiment has the configuration as a rack-parallel type electric power steering system. On the other hand, a steering system in a modified example has a configuration as a column-assist type, a pinion-assist type, a dual pinion-assist type, or a rack coaxial type electric power steering system. In the steering system in this modified example, because the transmission belt 53 is not arranged in the housing space 23 of the rack housing 20, freezing of the transmission belt 53 with solidification of water in the housing space 23 does not occur. Therefore, the steering system in the modified example produces advantageous effects that are similar to the advantageous effects (1) to (10) produced by the steering system 1 in the embodiment, except the effects related to freezing of the transmission belt 53.

The steering system 1 in the above-described embodiment has the configuration as a power steering system with the assist device 30. On the other hand, a steering system in a modified example has a configuration as a mechanical steering system in which the assist device 30 is omitted. In the steering system in this modified example, because the assist device 30 is omitted, freezing of the transmission belt 53 with solidification of water in the housing space 23 does not occur. Therefore, the steering system in the modified example produces advantageous effects that are similar to the advantageous effects (1) to (10) produced by the steering system 1 in the above-described embodiment, except the effects related to freezing of the transmission belt 53.

The invention may also be applied to electric power steering systems other than a rack-parallel type power steering system, and to Steering systems other than an electric power steering system, as long as water may enter a housing space of a rack housing of the steering system.

What is claimed is:

1. A steering system including a rack housing and a drainage device, wherein the drainage device includes:
    a drainage case having a case inlet port communicated with a housing space of the rack housing, a case outlet port communicated with an outside of the rack housing, a drainage space communicated with the case inlet port and the case outlet port, and a case bottom face that faces the drainage space; and
    a drainage valve arranged in the drainage space and having a hollow shape, the drainage valve having a valve body inlet port portion communicated with the case inlet portion, and a valve body outlet port portion that is made of a resin and interrupts communication between the case inlet port and the case outlet port when the valve body outlet port portion comes into contact with the case bottom face, wherein:
    the valve body outlet port portion is configured to deform and form a passage between the case bottom face and the valve body outlet port portion, and
    the drainage valve is configured such that water flowing through the hollow shape of the drainage valve exerts sufficient pressure on the valve body outlet port portion to deform the valve body outlet port portion and form the passage.

2. The steering system according to claim 1, wherein the valve body outlet port portion has a tapered shape in which a diameter of the valve body outlet port is increased from the valve body inlet port portion side toward the case bottom face.

3. The steering system according to claim 1, wherein:
the drainage valve has a convex portion having a shape that projects toward the drainage space; and
the convex portion constitutes the case bottom face.

4. The steering system according to claim 1, wherein, in the drainage valve, a valve body seal face, which is a face on an end portion side of the valve body outlet port portion, is in contact with the case bottom face, and a valve body opposing face, which is a face on the valve body outlet port portion closer to a center side of the valve body outlet port portion than the valve body seal face, faces the case bottom face via a gap.

5. The steering system according to claim 1, wherein, the valve body inlet port portion has a cylindrical shape and has a portion of which an outer periphery is circumferentially entirely pressed against the drainage case.

6. The steering system according to claim 1, wherein the drainage case has a mounting thread that is screwed into a valve fixing portion of the rack housing.

7. The steering system according to claim 6, wherein:
the drainage case has a first drainage case and a second drainage case that are formed as separate parts;
the first drainage case has the mounting thread; and
the second drainage case is fitted to the first drainage case.

8. The steering system according to claim 1, further comprising:
a rack shaft;
an electric motor;
a speed reducer; and
a ball screw device, wherein
the ball screw device is fitted to the rack shaft, and
the speed reducer includes (i) a drive pulley that is fitted to a motor shaft of the electric motor, (ii) a driven pulley that is fitted to the ball screw device, and (iii) a transmission belt that is looped over the drive pulley and the driven pulley.

9. The steering system according to claim 1, wherein the valve body outlet port portion is disposed between the case inlet port and the case bottom face.

10. The steering system according to claim 1, wherein the drainage case includes a first case and a second case that are formed as separate parts, the case inlet port being disposed in the first case and the case outlet port disposed in the second case, such that the case bottom face forms a surface of the second case.

11. The steering system according to claim 1, wherein the passage is disposed in both the first case and the second case.

12. The steering system according to claim 1, wherein the valve body outlet port portion is closer to the case inlet port when the valve body outlet port portion is deformed than when the valve body outlet port portion is not deformed.

* * * * *